United States Patent [19]

John

[11] Patent Number: 4,469,857
[45] Date of Patent: Sep. 4, 1984

[54] TWO COMPONENT SYSTEM FOR THE PRODUCTION OF A SYNTHETIC RESIN COMPOUND CAPABLE OF CURING IN THE ABSENCE OF MOISTURE CONTAINING A POLYISOCYANATE, A POLYENAMINE, AND A CARRIER COMPOUND HAVING WATER AGGREGATED THERETO

[75] Inventor: Günther John, Hamburg, Fed. Rep. of Germany

[73] Assignee: Minnesota Mining and Manufacturing Company, Saint Paul, Minn.

[21] Appl. No.: 502,612

[22] Filed: Jun. 17, 1983

Related U.S. Application Data

[63] Continuation of Ser. No. 328,758, Nov. 6, 1981, abandoned.

[51] Int. Cl.³ .............................................. C08G 18/00
[52] U.S. Cl. ......................................... 528/59; 528/71; 528/75
[58] Field of Search .............................. 528/59, 71, 75

[56] References Cited

U.S. PATENT DOCUMENTS 3,865,791  2/1975  Brinkmann et al. .................. 528/75
4,255,243  3/1981  Coqueugniot et al. ............... 528/75

Primary Examiner—Maurice J. Welsh
Attorney, Agent, or Firm—Donald M. Sell; James A. Smith; Gerald F. Chernivec

[57] ABSTRACT

A two-component system for producing a flowable to plastic synthetic resin composition comprising, as the first component, a combination of a polyisocyanate and an enamine, and the second component comprising a carrier compound having water aggregated thereto.

7 Claims, No Drawings

TWO COMPONENT SYSTEM FOR THE PRODUCTION OF A SYNTHETIC RESIN COMPOUND CAPABLE OF CURING IN THE ABSENCE OF MOISTURE CONTAINING A POLYISOCYANATE, A POLYENAMINE, AND A CARRIER COMPOUND HAVING WATER AGGREGATED THERETO

This is a continuation of application Ser. No. 328,758 filed Nov. 6, 1981 and now abandoned.

DESCRIPTION

TECHNICAL FIELD

The invention relates to a two-component system for the production of a flowable to plastic synthetic resin composition curing in the absence of water and in any desirable thickness.

BACKGROUND ART

Flowable to plastic synthetic resin compositions based on poly-isocyanates are known, which are adapted to be applied by casting, painting, filling and the like, the compositions being capable of hardening or curing in the presence of water.

For example, a one-component system is disclosed in U.K. Pat. No. 1,064,841 which contains a polyisocyanate and a poly-aldimine or ketimine. The mixture must be stored with the absolute exclusion of water and has a very short processing time. In German publication 16 94 237 there is disclosed a polyisocyanate, the isocyanate groups of which are blocked, so as to effect curing in the absence of water at an elevated temperature. In addition, it is also taught in this reference that di- and polyenamines are as effective as cross-linking agents as poly-ketimines, but less sensitive to hydrolysis, which is an advantage relative to the shelf life of the compound. In German publication 21 16 882 the production of di- and polyenamines is described, indicating that the shelf life of mixtures consisting of polyisocyanates and polyenamines is about 9 months. Further, the use of mixtures containing di- or polyisocyanates and di- or polyenamines as potting, smoothing, plating or coating materials is taught in German publication 21 25 247. The mixture described therein has a shelf life of more than 9 months, with the proviso that moisture is absent. Curing is effected through the influence of moist air; water or water vapor.

In practice, however, it is disadvantageous that with mixtures of di- or polyisocyanates and di- or polyenamines the curing reaction is started immediately when the components contact moisture. If such a mixture is to be applied to large areas at higher degrees of air moisture, say at about 75 percent relative humidity and above, the curing will begin during application, that is, from the processor's standpoint, prematurely. On the other hand, the curing time is relatively long with low air moisture, at about less than 60% relative humidity. When curing is carried out with water or vapor, the curing will occur quicker, but also uncontrolled.

Known polyisocyanate/polyenamine mixtures have another disadvantage, that being that uniform curing of thicknesses of greater than about 0.1 mm may not be attainable. The moisture from the air, or water, or water vapor, can penetrate into the mixture only from the outside to the inside, so that with greater thicknesses, the reactive composition near the free surface will be cured to a greater degree than the inside surface, which will have an unfavorable effect on the properties of the cured product. Because of this, known polyisocyanate/polyenamine mixtures are in general unsuited for embedding, impregnating, coating of electrical structural members for insulation, etc.

The invention is therefore based upon the problem of removing the above-mentioned disadvantages and of providing a synthetic resin which will cure without moisture. Water is applied in an amount not exceeding that necessary for curing, and the water is uniformly distributed throughout the mass. Curing takes place within a predeterminable period of time.

DISCLOSURE OF INVENTION

The problem is solved by a two-component system, the first component being a mixture consisting of at least one di-isocyanate, polyisocyanate, adduct of an isocyanate and a polyol having an excess of isocyanate groups versus the hydroxyl groups and at least one di- or polyenamine; the second component being a material containing as the active component a carrier material bonded to water.

The invention is based on the insight that, unexpectedly, the hydrolysis of the di- or polyenamines in the polyisocyanate/polyenamine mixtures which is necessary for the curing reaction may be effected by water aggregated to a carrier material. The polyenamines are unexpectedly in a position to withdraw the water from the carrier material or to induce same to discharge the water in the presence of the enamines.

DETAILED DESCRIPTION

The first component in the two-component system may comprise any one, or a mixture, of known di- or polyisocyanates, such as for example 2,4-toluylene di-isocyanate; 4,4'-di-phenylmethane-di-isocyanate; 1-6-hexamethylene-di-isocyanate; 1,5-naphthalene-di-isocyanate, 3,3'-isophorene-di-isocyanate; dimethoxy-4-4'biphenyl-di-isocyanate; phenylene-di-isocyanate (isomers); 1-methyl-2,4,4-di-isocyanate-cyclohexane; and adducts of the above di-isocyanates with polyols such as trimethylolpropane. The ratio of NCO/OH should be between about 1.0 to about 1.5.

For the di- or polyenamine, any of the known compounds described in literature, for example, in the German publication 21 26 822 (corresponding to U.S. Pat. No. 3,865,791, incorporated herein by reference) can be used. Polyenamines result from the reaction of secondary amines with selected aldehydes and ketones, the general formula thereof being illustrated at column 1, lines 33 through column 2, line 17 of aforementioned U.S. Pat. No. 3,865,791.

The first component may further contain admixed therein plasticizers such as di-alkyl-phthalate, hydrogenated biphenyl, chloroparaffine, mixtures of aliphatic and aromatic mineral oil distillates, etc.

As the second component, according to the invention, a material is used which contains as the active component a carrier material having water aggregated thereto. The term "Carrier material having water aggregated thereto" covers:

(a) hydrates, especially inorganic compounds having water molecules coordinatively aggregated in stoichiometric amounts, with solid hydrates containing the water as water of crystallization being preferred.

Examples of hydrates, with which the cross-linking reaction can occur at ambient temperature include:

$Na_2SO_4 \times 10H_2O$ $CaSO_4 \times 2H_2O$ $CaSO_4 \times \frac{1}{2}H_2O$ $Na_2B_4O_7 \times 10H_2O$ $2ZnO \times 3B_2O_3 \times 3.5H_2O$ Examples of hydrates with which the cross-linking reaction takes place at elevated temperatures, include:

$KNaCO_3 \times 6H_2O$ (at temperatures above 100° C.)

$ALO(OH)$ (at temperatures above 160° C.)

$Al(OH)_3$ (at temperatures above 200° C.)

Alums (depending on the respective type at temperatures from about 90° C. to above 200° C.)

(b) Hydrogels having water molecules aggregated in nonstoichiometric amounts. Examples are gels of silicic acid, montmorillonite gels and polysaccharide gels. Preferred hydrogels are those having an inorganic carrier material.

In the two component system according to the invention the active component is present in a solid state, and preferably in a pulverulent state. In this condition, the active components are simplest to handle.

As has been indicated above, there are active substances capable of making available the aggregated water at ambient temperature or, in other words, from which the polyenamines can extract the water at ambient temperature, as well as active substances with which the discharge of water takes place only at elevated temperatures. So, through selection of the active component (the carrier material having water aggregated thereto) it is possible to determine in advance the curing conditions or, in a given case, vary them in a controlled manner.

The second component of the system according to the invention may comprise solely the active component or may be a mixture of the active component and conventional filler materials. Any filler material or mixture of filler materials may be employed, provided it is inert vis-a-vis the active component. The filler material is suitably selected with the intended use of the two-component system as a guide, so that it may contribute to increase properties such as compressive strength, toughness, electrical properties, coloration, or the like, of the cured product. Such filler materials include, for example, chalk, barium sulfate, kaolin, asbestos, titanium dioxide, ferric oxide, stearate, coloring pigments, organic, and powdered substances, such as ground reclaim rubber.

Some of the above filler materials are useful only in the two-component system according to the invention and not in known one-component systems, because they would react either with the polyisocyanate or the polyenamine components, whereby the hardening period and/or the properties of the finished product could be unfavorably influenced. For this reason, the two-component system according to the invention is more versatile. In the event a large amount of filler material should be necessary, a liquid hydrate or a hydrosol may be advantageous as the active component.

Immediately prior to using the two-component system the two components are well mixed with each other. Thereby the water necessary for the hydrolysis of the enamine proportion is uniformly distributed throughout the entire compound. The hardening or curing then commences simultaneously over the entire mass cross sectional area and, consequently, a uniform hardening and cross-linking reaction, respectively, taken place. The product obtained, of course, is superior to a non-uniformly cross-linked one. As only so much water is applied as is necessary for the hydrolysis of the enamines and thus for the reaction thereof with the isocyanates, that means that there will not be any excess water in the cured product. Thus, there is no danger of the electrical properties, in particular, of the cured product being negatively influenced, which is true for the almost all synthetic materials if they have assimilated moisture. Therefore, the two-component system according to the invention may also be used for the insulation of current-carrying electrical structural components.

Curing occurs within a short period of time using an active component capable of reacting with polyenamines at normal temperatures. In case large areas or structural members of complicated shapes are to be potted or coated with different thicknesses of layers or insulation, respectively, it is recommended to use an active component capable of reacting with the polyenamines at an elevated temperature. One will then have at one's disposal a synthetic resin compound having a "pot life" or a processing time as long as may be desired. Also with this embodiment of the system according to the invention, independence of the curing conditions based on air moisture is retained.

The manner in which the invention is carried into practice is illustrated by the following example

EXAMPLE

A two-component system of the following composition was prepared:

| Component A | |
|---|---|
| Isophorene-di-isocyanate adduct with 4 percent NCO | 35 weight percent |
| Di-undecylphthalate | 50 weight percent |
| Polyenamine (XE4131 of the Schering AG) | 15 weight percent |
| | 100 weight percent |
| Viscosity 25 poise | |
| Component B | |
| $Na_2SO_4.10 H_2O$ | 3.75 weight percent |
| Chalk | 96.25 weight percent |
| | 100 weight percent |

The two components A and B were thoroughly mixed with each other in a mixing ratio of 20:80. The gel time of this system was 18 minutes and the curing time 240 minutes, determined by testing the Shore hardness A.

The following properties were established for the cured product:

| Shore A hardness | 25 to 30 |
|---|---|
| Tensile strength | 1 MPa |
| Elongation at break | 200% |
| Impact strength | above scale |
| Volume resistivity at 23° C. | $10^{13}$ Ohm · cm |
| Volume resistivity at 50° C. | $10^{12}$ Ohm · cm |
| Volume resistivity at 80° C. | $10^{12}$ Ohm · cm |
| Permittivity $\epsilon r$ at 23° C. | 3.6 |
| Permittivity $\epsilon r$ at 50° C. | 4.0 |
| Permittivity $\epsilon r$ at 80° C. | 4.2 |
| Dissipation factor at 23° C. | 0.02 |
| at 50° C. | 0.09 |
| at 80° C. | 0.02 |
| Moisture absorption after 24 hours | |

| -continued | |
| --- | --- |
| immersion in water | 0.11% |
| after 56 days in water of 50° C. | 1.4% |

It has thus been rendered possible through the invention to measure the water content of a synthetic resin compound containing polyisocyanate and a cross-linking agent in such a manner that exactly the amount of water is available that is necessary for the hydrolysis of the polyenamine for reaction with the isocyanate groups of the polyisocyanate, and to distribute this amount uniformly through the entire compount. As active components are available which deploy their activities at different temperatures, it has also become possible to exactly determine in advance the imitiation of the cross-linking reaction.

I claim:

1. A two-component system for the production of a flowable to plastic synthetic resin compound capable of curing in the absence of moisture, comprising:
    (a) at least one compound having reactive isocyanate groups selected from the group consisting of diisocyanates, polyisocyanates, and adducts of an isocyanate and a polyol;
    (b) at least one di- or polyenamine; and
    (c) at least one active component comprising a carrier compound having water aggregated thereto.

2. A two-component system according to claim 1 wherein said active component is a hydrate in which the hydrate water is aggregated to an inorganic compound.

3. A two-component system according to claim 2, wherein the inorganic compound is a salt.

4. A two-component system according to claim 1 wherein the active component is a hydrogel having water aggregated thereto.

5. A two-component system according to claim 1 wherein the active component is capable of making available the aggregated water for curing at ambient temperature.

6. A two-component system according to claim 1 wherein the active component is capable of making available the aggregated water for curing only at an elevated temperature.

7. A two-component system according to claim 1 wherein the active component is pulverulent.

* * * * *